United States Patent Office 3,367,416
Patented Feb. 6, 1968

3,367,416
INHIBITING SALT DEPOSITION
Paul H. Ralston, Bethel Park, and Leonard J. Persinski, Pittsburgh, Pa., assignors to Calgon Corporation
No Drawing. Filed Mar. 31, 1965, Ser. No. 444,458
5 Claims. (Cl. 166—1)

This invention relates to methods of inhibiting the deposition and/or crystallization of sodium chloride from supersaturated solutions thereof.

In the production of petroleum from underground sources, the oil is usually mixed or associated with concentrated brines containing large quantities of dissolved salts such as sodium chloride, calcium chloride, magnesium chloride, etc. The concentrated brines in underground strata are usually at elevated temperatures, i.e. in the neighborhood of 90 to 300 degrees Fahrenheit. The temperature of the brine is reduced as it moves toward the earth's surface in the petroleum recovery process, and as the temperature falls the dissolved salts of the more concentrated brines tend to come out of solution, usually in the form of crystals on the inner surface of the well bore and associated piping, pumps, rods, etc. It is not unusual in certain geographic areas for depositions so formed to interfere with pump operations or to completely block the flow of oil and brine within a relatively short time and to render a given well an economic failure because of the frequency of "down time" necessary for cleaning and removing the depositions. Sodium chloride is the most common of the products which deposit from such brines.

The oilfield brines in which our invention is most useful vary in composition from practically pure concentrated sodium chloride brines to brines which contain major amounts of magnesium and calcium chlorides. In any case, they will deposit sodium chloride on reduction in temperature prior to the deposition of any other salt. A typical Michigan predominately chloride brine on which our invention is effective might contain, for example, about 20% calcium chloride, 3% magnesium chloride, and 10% sodium chloride. Such concentrated brines predominating in calcium and magnesium chlorides and typically low in sulfates and carbonates will initially deposit sodium chloride even though its concentration is as small as or even ess than 1%. Even where the ratio of calcium chloride to sodium chloride is 50 to 1, the deposits formed are substantially pure sodium chloride until the sodium chloride content is virtually exhausted. Our invention is applicable to brines of any composition which tend to deposit sodium chloride because of reductions in temperature.

We have found that by adding a small amount of nitrilotriacetamide or an acid salt of nitrilotriacetamide to the brine, the deposition of sodium chloride from supersaturated solutions undergoing reductions in temperature is greatly inhibited. Moreover, we have found that supersaturated solutions containing sodium chloride can be made at a given temperature with concentrations of salt otherwise impossible to attain. Such solutions are useful wherever saturated salt solutions at elevated temperatures are transported to another point at a lower temperature with subsequent supersaturation.

Nitrilotriacetamide and its acid salts are readily soluble in strong brines. In addition, they have no affinity for or tendency to react with dissolved iron which is almost always present in industrial and oilfield brines and which is very troublesome because of its generally undersirable reaction products. Nitrilotriacetamide and its salts may be handled safely and form no known toxic degradation products. By far the most commonly available acid salts are the sulfuric and hydrochloric acid adducts $N(CH_2CONH_2)_3 \cdot H_2SO_4$ and $N(CH_2CONH_2)_3 \cdot HCl$ These are operable over the full range of our invention and as far as we are aware, any acid salt is also effective. Useful acid salts such as citric, phosphoric, and oxalic may be made by reacting the nitrilotriacetamide with the appropriate acid.

U.S. Patent 2,990,246 issued to Scott, Bromby and Allday discloses the use of nitrilotriacetamide $N(CH_2CONH_2)_3$ as an anti-cake additive for common salt to reduce the tendency of solid crystals thereof to cake together during storage. However, there is no disclosure to the effect that it may be used to inhibit salt crystallization in supersaturated solutions undergoing reductions in temperature. Scott et al. add nitrilotriacetamide to the solid salt rather than to brine.

The effects of adding small amounts of nitrilotriacetamide or acid salts thereof to brines saturated with sodium chloride which are subsequently cooled are shown in the accompanying tables.

In Table I, the percent inhibition of salt deposition is tabulated for various concentrations of nitrilotriacetamide in the brine.

Sodium chloride brine solutions were prepared equivalent to saturation at 80° C. (27.5 grams NaCl dissolved in 72.5 grams water). In the case of the acid salts of nitrilotriacetamide, small amounts of alkali were added to insure that the unbuffered test solution would be in the neutral range. However, this pH adjustment is not essential in oilfield waters which are naturally buffered and no alkali need be added. Typically, the oilfield brines we have worked with have a pH about 4.5. Our invention is most effective where the pH of the resulting brine is at least 2.5; however there is still a significant effect at a pH as low as 1.0.

The saturated salt solutions, containing the concentration of inhibitor shown for each case, were permitted to cool to room temperature from an initial temperature of 100° C. This cooling period covered about one and a half hours. Storage at room temperature (25° C.) was continued for hours or days depending on the effectiveness of the inhibitor. Untreated brine controls began depositing salt from solution within 15–20 minutes of room temperature storage after being at boiling temperature. Substantially all of the sodium chloride content greater than its saturation limit at room temperature came out of the untreated solution after a few hours.

Percent inhibition data in Table I are averages of results obtained by two different methods of calculation. In the first method, the chloride content of the test brine at room temperature was determined by titration and compared with the chloride content of untreated brines under the same conditions. The chloride content, obtained by titration of treated brines under the same conditions and exhibiting no salt deposition was assigned a value of 100% inhibition; that of untreated brines was assigned a value of 0% inhibition.

In the second method of determining percent inhibition of salt crystallization, the crystallized salt was removed from the brine, dried, and weighed. This result was compared with the weight of salt deposited from untreated brines having a value of 0% inhibition. 100% inhibition of course represents those samples in which no salt crystals appeared. The two results in terms of percentage inhibition were averaged to yield the figures which appear in Table I.

TABLE I

| Inhibitor | Concentration (p.p.m.) | Percent Inhibition of NaCl Deposition | | | |
|---|---|---|---|---|---|
| | | 1 day | 2 days | 9 days | 23 days |
| $N(CH_2CONH_2)_3$ | 0 | | | | |
| $N(CH_2CONH_2)_3$ | 1.0 | 19 | | | |
| $N(CH_2CONH_2)_3$ | 5.0 | 32 | | | |
| $N(CH_2CONH_2)_3$ | 12.5 | 34 | | | |
| $N(CH_2CONH_2)_3$ | 25.0 | 47 | 58 | | |
| $N(CH_2CONH_2)_3$ | 37.5 | 69 | | | |
| $N(CH_2CONH_2)_3$ | 50.0 | 80 | 81 | 81 | 69 |
| $N(CH_2CONH_2)_3$ | 62.5 | 94 | | | |
| $N(CH_2CONH_2)_3$ | 75.0 | 99+ | | | |
| $N(CH_2CONH_2)_3$ | 100.0 | 100 | 100 | | 96 |
| $N(CH_2CONH_2)_3$ | 200.0 | | 100 | | |
| $N(CH_2CONH_2)_3 \cdot H_2SO_4$ | 100.0 | 98 | | | |
| $N(CH_2CONH_2)_3 \cdot HCl$ | 100.0 | 100 | | | |

It thus may be seen that it is now possible to prepare sodium chloride-bearing brines containing more than the normal saturation concentration at a relatively low temperature, by including as little as 1 part per million of nitrilotriacetamide in a relatively high temperature saturated brine. The remarkable stability of these supersaturated solutions make them useful in oilfield applications as well as other applications where temperature change and time tend to deposit sodium chloride.

The unexpected nature of the action of nitrilotriacetamide is illustrated in Table II by comparison of its effect with that of other similar compounds under test conditions previously described. In Table II, the percent inhibition of NaCl deposition is calculated as the average of two percentage results computed in the same manner as for Table I.

It will be seen from Table II that none of the compounds tested was nearly as effective as nitrilotriacetamide or their salts.

TABLE II

| Inhibitor | Concentration (p.p.m.) | Percent Inhibition of NaCl Deposition | | |
|---|---|---|---|---|
| | | 1 hr. | 5 hrs. | 24 hrs. |
| Acetamide $CH_3CONH_2$ | 200 | | 15 | |
| Benzamide $C_6H_5CONH_2$ | 200 | | 32 | |
| Dimethyl Acetamide $CH_3CON(CH_3)_2$ | 200 | | | 13 |
| Urea $NH_2CONH_2$ | 200 | | | 7 |
| Nitrilotriproprionamide $N(CH_3CH_2CONH_2)_3$ | 200 | | | nil |
| Nitrilotriacetic Acid $N(CH_2COOH)_3$ | 100 | Many medium salt crystals. | | |
| | 200 | Many small salt crystals. | | |
| | (¹) | Many small salt crystals. | | |

¹ 100+NaOH.

It is apparent from the data in Table I that a small amount of nitrilotriacetamide or an acid salt thereof is effective to inhibit salt deposition. We have found that as little as 1 part per million exhibits noticeable beneficial effects. Although 75–100 p.p.m. of our inhibitor in brine under the laboratory conditions recited gave full inhibition, greater concentrations may be used. Concentration of nitrilotriacetamide and acid salts up to saturation may be used satisfactorily but are not particularly advantageous over about 300 p.p.m. Concentrations of as much as 1000 p.p.m. nitrilotriacetamide based on the brine have been tried in the laboratory in tests under the same conditions as for Table I with no adverse side effects and with complete inhibition.

Thus, it may be said that our invention is a method of inhibiting the deposition of NaCl from saturated and supersaturated brines thereof under conditions of decreasing temperature comprising adding to said brines a small amount of nitrilotriacetamide or its salts prior to the reduction in temperature. A preferred range is about 1 p.p.m. to about 300 p.p.m. based on the brine. For oilfield operations where the underground brine containing sodium chloride has temperatures ranging generally from about 90° F. to about 300° F., we prefer to add to the brine about 5 to about 200 p.p.m., based on the brine, of nitrilotriacetamide or an acid salt thereof. Under conditions where the brine is used for other applications such as saturated brine transportation or the like, about 5 to about 200 p.p.m. may be used.

In practical applications, our inhibitor may be added in the form of a solid such as a pellet (mixed with appropriate binders) or as part of a matrix in stick or block form with a solution rate regulating composition such as a waxy amide. It also may be added in pure crystalline form or as a solution in water since the nitrilotriacetamide and acid salts are compatible with commonly used freeze-proofing agents such as isopropanol.

The inhibitor should be added to the brine in the area of relatively high temperature prior to the point at which solid deposits of sodium chloride tend to form on surfaces contacting the brine. Thus, our invention includes the method of inhibiting the deposition of solid sodium chloride in oilfield producing equipment due to the decrease in temperature of connate brines comprising adding our inhibitor to said connate brine at a point before that at which solid sodium chloride would otherwise tend to deposit, or prior to a reduction in temperature of the brine causing deposition of sodium chloride due to supersaturation thereof.

An example of a successful field trial follows. Prior to treatment with our invention, producing oil wells in the Michigan area accumulated salt and were kept in operation by adding fresh water through the annulus every 4–7 days to remove sodium chloride deposits. The composition of the connate brine after removal from the well and filtering was, based on the total brine, 19.5% $CaCl_2$, 2.4% $MgCl_2$, and 7.6% NaCl. The operation required the use of a high pressure water truck and costly manpower. The removal procedure was not completely effective, and expensive reconditioning was often required on down-hole pumps and tubing. Down-hole temperatures were 90–120° F.

The hydrochloric acid salt of nitrilotriacetamide was fed in liquid form (dissolved in water) at the rate of 150 p.p.m. based on the effluent brine. Salt deposition was almost completely inhibited; the only deposits observed were in above ground flow chokes and intermitter valves. The deposit was very finely crystalline, required only simple water flushing and occurred on the average of every three weeks. No down-hole flushing was required since salt deposits did not accumulate on subsurface equipment.

Our invention is not limited to the examples and illustrations herein. It may be otherwise variously practiced within the scope of the following claims.

We claim:
1. Method of inhibiting the deposition of sodium chloride in oilfield producing equipment due to a decrease in temperature of oilfield brine associated with oil comprising adding to said brine, at a point prior in the producing process to that at which sodium chloride would otherwise deposit, an effective amount of an inhibitor composition selected from the group consisting of acid salts of nitrilotriacetamide.

2. Method of claim 1 in which the inhibitor composition is in a concentration of from 1 to about 300 parts by weight per million parts brine.

3. Method of claim 1 in which the inhibitor composition is nitrilotriacetamide hydrochloride.

4. Method of inhibiting deposition of sodium chloride from a brine associated with producing oil, said brine being substantially saturated and initially at a temperature of about 90° F. to about 300° F., which brine has a tendency when produced along with oil to decrease in temperature whereby to deposit sodium chloride on well equipment and the like, comprising adding to said brine at a point ahead of that at which solid sodium chloride would otherwise tend to deposit from about one to about 1000 parts by weight of an acid salt of nitrilotriacetamide.

5. Method of claim 4 in which the compound added is nitrilotriacetamide hydrochloride.

References Cited

UNITED STATES PATENTS

| | | | |
|---|---|---|---|
| 2,429,594 | 10/1947 | Case. | |
| 2,990,246 | 6/1961 | Scott et al. | 23—89 |
| 3,000,708 | 9/1961 | Kapsenberg | 23—89 X |
| 3,021,901 | 2/1962 | Earlougher | 166—42 |
| 3,213,018 | 10/1965 | Roland et al. | 166—1 X |
| 3,281,206 | 10/1966 | Van Weele | 23—89 X |

FOREIGN PATENTS 848,328  9/1960  Great Britain.

CHARLES E. O'CONNELL, *Primary Examiner.*

ERNEST R. PURSER, *Examiner.*

IAN A. CALVERT, *Assistant Examiner.*